May 10, 1960 — A. F. KINCKINER — 2,936,449
DIRECT READING OSCILLOSCOPE SCALE
Filed Dec. 19, 1957 — 3 Sheets-Sheet 1

Allan F. Kinckiner
INVENTOR.

BY
Attorneys

May 10, 1960  A. F. KINCKINER  2,936,449
DIRECT READING OSCILLOSCOPE SCALE
Filed Dec. 19, 1957  3 Sheets-Sheet 2

Allan F. Kinckiner
INVENTOR.

BY
Attorneys

May 10, 1960  A. F. KINCKINER  2,936,449
DIRECT READING OSCILLOSCOPE SCALE
Filed Dec. 19, 1957  3 Sheets-Sheet 3

Allan F. Kinckiner
INVENTOR.

BY

United States Patent Office 2,936,449
Patented May 10, 1960

2,936,449

DIRECT READING OSCILLOSCOPE SCALE

Allan F. Kinckiner, Philadelphia, Pa.

Application December 19, 1957, Serial No. 703,926

7 Claims. (Cl. 340—368)

This invention relates generally to a novel oscilloscope scale, and more particularly to a scale which will allow the operator to directly read voltage levels according to the wave form on the scope screen.

It is the principal object of this invention to provide an attachment for an oscilloscope face which will speed the operation of the interpretation of wave signals on the face.

It is another object of this invention to provide means on the face of an oscilloscope for indicating to the operator a particular condition of one of the scope controls.

It is a still further object of this invention to provide novel means for mounting an attachment to the oscilloscope face.

It is a still further object of this invention to provide a unique switch attachment to allow the scale to indicate a condition of an oscilloscope control.

In accordance with the above stated objects, below is described an oscilloscope scale face utilizing, either as an attachment or as an integral part thereof, light transmitting arcuate sections positioned around the circumference of the scope face and having light source means attached thereto. The light transmitting sections have indicia inscribed thereon for distinguishing the plurality of sections, one from the other. Electrical switch means are provided which are interposed between the light source means and an electrical energy source for selectively illuminating a particular light source for selectively illuminating a particular light transmitting section. The switch means take the form of a novel rotary switch which is mounted on a conventional scope attenuator switch for selectively illuminating a particular section in accordance with a particular position of the attenuator control.

The usual oscilloscope has vernier gain control and an attenuator control which attenuates generally by a factor of ten. When working with an oscilloscope, an operator generally finds it extremely important to know the voltage necessary on the vertical deflection plates for a particular vertical deflection of the electron beam. For example, it is often helpful to the operator if he knows that a 50-volt input, for instance, will cause a deflection of the electron beam of one inch. When the attenuator control is turned, the sensitivity is changed and the operator must be aware of the new value. For instance, now only 5 volts may be necessary to deflect the electron beam vertically one inch. Thus, a certain amount of memorizing or frequent reference to the attenuator control is necessary.

In accordance with this invention, the operator of the oscilloscope will be quickly presented with the voltage necessary to vertically deflect the electron beam a particular distance. Indicia inscribed on the sections indicate to the operator the peak to peak values of voltage for vertical deflection of a particular distance.

While the assembly specifically presented below is intended as an addition for oscilloscopes already in use, it is applicable as a new feature on scopes not yet marketed. Of course, slight adaptations will be necessary to incorporate the teachings of this invention as a new feature for oscilloscopes, but such adaptations are considered within the skill of one versed in the art.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1:
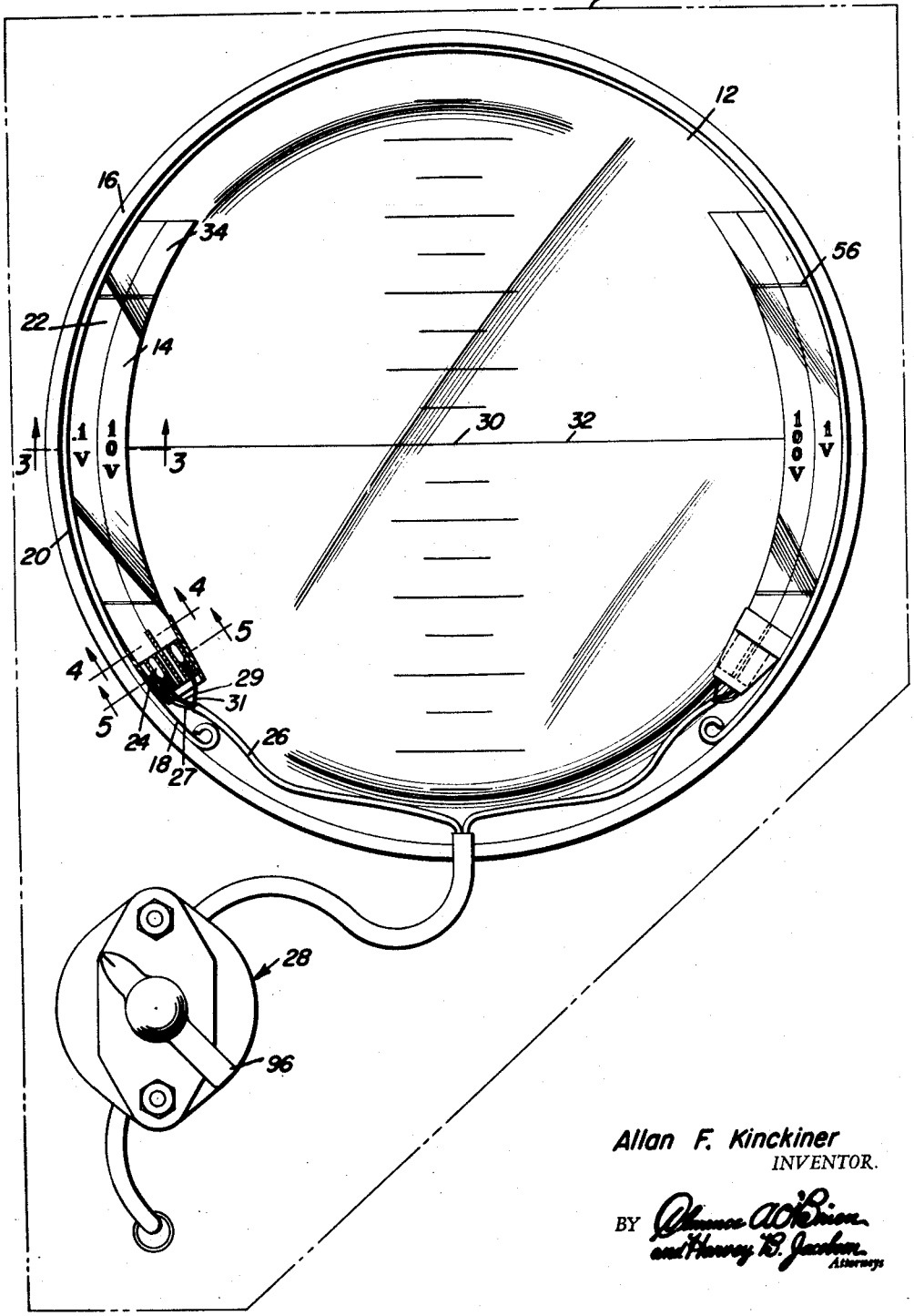
Figure 1 is a front elevational view showing the apparatus of this invention in place on the face of a conventional oscilloscope.

With continuing reference to the drawings, the numeral 10 generally represents a conventional oscilloscope having a scope face 12 used to visually observe characteristics of electrical signals. In accordance with this invention, light transmitting arcuate sections 14 which are preferably transparent but which might be translucent, are resiliently held within the hood 16 of face 12 by a spring 18 which bears outwardly against a tab 38 which is fixedly connected to a terminal section 22. Small bulbs 24 are placed within each light transmitting section 14 for selective illumination of the section. Leads 26, each including conductors 27, 29 and 31, electrically connect bulbs 24, which are preferably small grain of wheat lamps, to a single pole rotary-type electrical switch, generally designated as 28, mounted on the front of the oscilloscope 10 to selectively connect the bulbs 24 to a source of electrical energy, not shown.

Figure 2:
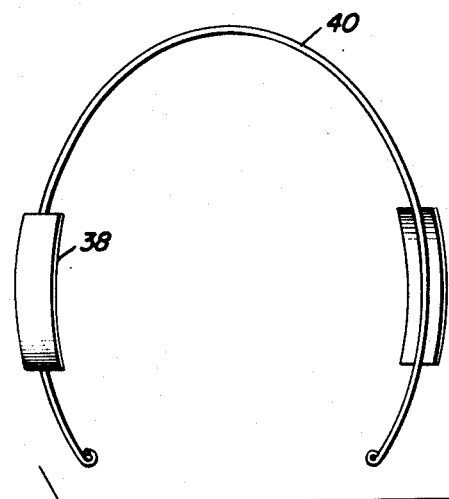
Figure 2 is a respective view illustrating in parts the scale of this invention.
Figure 2:
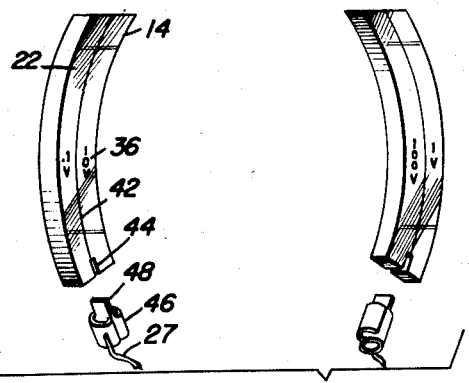

Referring now specifically to Figure 2, the sections 14 can be seen to be arcuate and possessing an identical depth. It is to be noted that the sections 14 are all identical in that they all form arcs of a circle having the same radius. That is, the radii of the circles of which the arcuate sections 14 are a part of are not drawn from a common center at the center of the scope base 12, but are arcs of circles having the same radii with a center displaced from the center 30 of scope face 12 along the diameter 32. This feature allows the sections 14 to be wider at their center along diameter 32 but narrower at their ends as at 34, where the horizontal distance on the scope face 12 lessens.

The sections 14 are cemented together as shown in Figure 2 and have distinguishing indicia, as shown at 36, for indicating to the operator of the oscilloscope 10 the position of the attenuator control, depending on which of the sections 14 are illuminated, as more specifically described below. Terminal section 22 has a tab 38 attached thereto as by cement. The tab 38 has a greater depth than the sections 14. This difference or depth extends outwardly from the face 12 toward the operator of the scope. A spring 40 is intended to be inserted within the tab 38 to bear outwardly thereagainst to press the tab 38 along with the accompanying sections against the hood 16 around the scope face 12.

Figure 3:
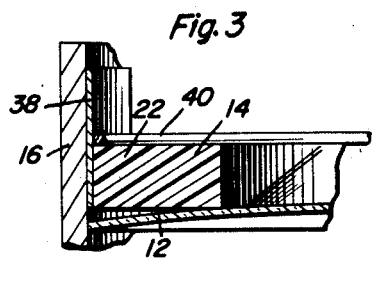
Figure 3 is a sectional view taken substantially along the plane 3—3 of Figure 1.

Now more specifically looking at the Figure 3 which is a sectional view taken substantially along the plane 3—3 of Figure 1, numeral 16 again represents the scope hood which has arcuate tab 38 bearing against it from the inner side due to the outward force exercised on the tab by the spring 40. Numeral 12 represents the scope face having the terminal section 22 and another arcuate section 14 supported along a portion of the circumference around scope face 12. Tab 38 is preferably cemented to section 22 which is cemented to section 14. Spring 40 resiliently bears against tab 38 to maintain the relationship between the sections and the hood.

Figure 5:
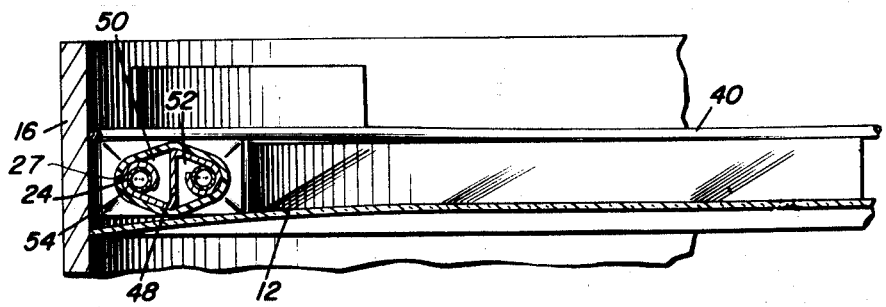
Figure 5 is another sectional view taken substantially along the plane 5—5 of Figure 1.

It will be noted that along the cemented seam 42 between the arcuate sections 14 is a short recessed portion 44 which accommodates an electrically conductive holder 46 by the insertion of extension 48 into slot 44. The two compartments 50 and 52 of holder 46 contain bulbs 24 for illuminating selective arcuate sections 14. The sectional view of Figure 5 shows the relationship between the bulbs 24, the hood 16 and the spring 40. A plastic covering 54 surrounds the conductive holder 46 for the purpose of directing the light from the bulbs 24 and to further protect the operator of the scope from any electrical shocks.

Figure 4:
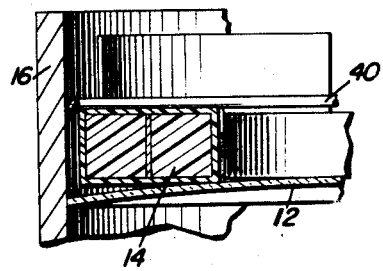
Figure 4 is a sectional view taken substantially along the plane 4—4 of Figure 1.

The arcuate tab 38, though deeper than the arcuate sections 14, is not of an equal length, as may be seen from Figure 1 and also the sectional view shown in Figure 4. The reason for this reduced length is to further narrow the horizontal distance across the scope face 12 which is rendered less functional by the inclusion of the arcuate sections 14.

Score lines, as at 56, illustrate to the operator the necessary impressed voltage to be placed on the vertical deflection plates for the particular vertical deflection on the scope face 12 measured by the scored lines 56. That is, when the attenuator control of the scope 10 is in a particular position, one of the arcuate sections 14 will be illuminated according to the particulars to be described more specifically below. Let us suppose at this time that the section illuminated is the one designated by the indicia "1 volt." This particular section forms the terminal section of the pair impressed against the hood 16 of the scope face 12 on the right side of Figure 1. When this one volt section is illuminated, it will indicate to the operator that one volt input on the vertical deflection plates of the scope will deflect the electron beam to a vertical level indicated by the score line 56. Likewise, if the 100-volt section is illuminated, it will require a 100-volt input to the vertical deflection plates to deflect the electron beam as far as the score line 56 on the scope face 12.

Figure 7:
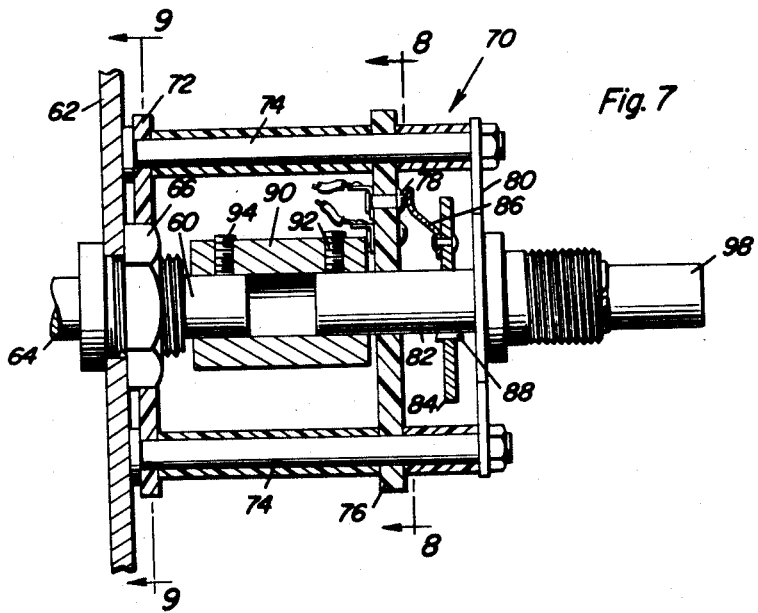
Figure 7 is a sectional view taken substantially along the plane 7—7 of Figure 6.
Figure 6:
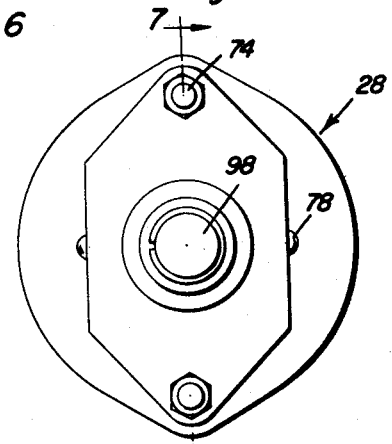
Figure 6 is an elevational front view of the rotary switch of this invention without its accompanying knob.
Figure 8:
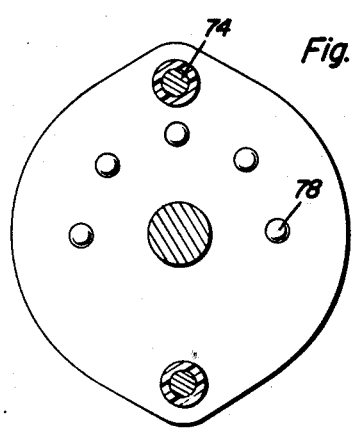
Figure 8 is another sectional view taken substantially along the plane 8—8 of Figure 7.
Figure 9:
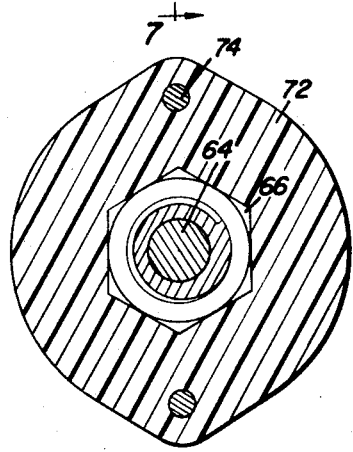
Figure 9 is still another sectional view taken substantially along the plane 9—9 of Figure 7.

In order to coordinate the illuminating action of the sections 14 with the correct position of the attenuator control 60 generally found on conventional scopes, a single pole rotary switch has been devised to selectively actuate the sections dependent upon the particular position of the attenuating control 60. In Figure 7, numeral 62 represents the oscilloscope frame having emerging therefrom a shaft 64 which internally of the oscilloscope 10 is connected to a potentiometer to control the input to the vertical deflection plates. The shaft 64 is held in place by hexagonal nut 66 which bears against the outer surface of frame 62.

The switch of this invention, designated generally as 70, has a lower insulated wafer plate 72 having hexagonal cut-out 74 which fits over the hexagonal nut 66 to prevent any turning of the switch 70 relative to the nut 66. Perpendicular to the lower wafer 72 are a pair of spacers 74 to which are further attached wafers 76 having electrical contact 78 thereon and wafer or front plate 80. The switch 70 has a rotatable axis 82 therein which fixedly carries a contact plate 84 having an electrical contact 86 for making electrical connection with the contact 78. The plate 84 is keyed at 88 to the axis 82 so that it rotates along therewith. A bushing 90 concentrically fits around axis 82 and is maintained in fixed relationship with the axis 82 by pressure exerted on the axis by setscrew 92. Another setscrew 94 communicates with the shaft 60. It should be apparent, therefore, that bushing 90 will transmit rotational movement from axis 82 to shaft 60. Of course, a knob, as shown at 96 in Figure 1, is adapted to be placed on an extension of the shaft as at 98. Though not shown, the contacts 78 extend electrically through contact 86, through plate 84, to an electrical energy source. Furthermore, the contacts 78 are each electrically connected to a bulb 24 for illumination of a particular section 14. Therefore, it can be seen that upon rotation of axis 82, the shaft 64 controlling the attenuation of the oscilloscope will rotate and a particular section 14 will illuminate corresponding to the shaft position.

In summary, with the structure of this invention placed on a conventional oscilloscope, the operator of the oscilloscope is able to direct his complete attention toward the scope face 12 which reveals the wave form of an electrical signal. While directing his attention toward the scope face 12, he is able to know in what position the attenuator control is by simply noticing which of sections 14 is illuminated. The operator then immediately knows the approximate magnitude of the voltage wave form illustrated before him. The device eliminates the need for frequent reference to the switch position. As indicated by the above specification, the device of this invention can be easily installed within the hood of an oscilloscope, and likewise can of course be easily removed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A direct reading oscilloscope scale comprising a cathode ray oscilloscope having at least a circular scope face and an attenuator control knob, a plurality of arcuate shaped light transmitting sections mounted on a portion of the circumference of said face, each of said sections having distinguishing indicia thereon, said sections forming adjacent layers in said circumferential portion in a plane extending substantially parallel to said face, individual lights mounted in each section, an auxiliary electrical switch, said switch mounted on said attenuator control for mechanically controlling said control, an electrical energy source, means including said switch electrically interposed between said lights and said source for selectively illuminating said sections in accordance with the positions of the attenuator control so as to illuminate said indicia.

2. A direct reading scale construction for an oscilloscope face having a hood comprising arcuate shaped light transmitting sections within said hood, each of said sections having distinguishing indicia thereon, an adhesive maintaining said sections in fixed relationship whereby they form adjacent layers in a plane extending substantially parallel to said face, a tab, said tab having a greater depth than said sections, said tab being attached to a section acting as the terminal layer, and spring means bearing outwardly on said tab to urge said tab into engagement with said hood to maintain said tab and sections in a fixed position relative to said hood.

3. The combination of claim 2 wherein said sections include light sources, means for selectively energizing said light sources to illuminate said sections.

4. The combination of claim 2 wherein each of said arcuate sections has the same radius curvature.

5. A direct reading oscilloscope scale comprising a cathode ray oscilloscope having at least a circular scope face and an attenuator control knob, a plurality of arcuate shaped light transmitting sections mounted on a portion of the circumference of said face, each of said sections having distinguishing indicia thereon, said sections forming adjacent layers in said circumferential portion in a plane extending substantially parallel to said face, individual lights mounted in each section, and means operatively connecting said attenuator control knob to said lights whereby said individual lights will be selectively energized dependent upon the position of said attenuator control knob.

6. The combination of claim 5 wherein said oscilloscope face is provided with a hood, said arcuate shaped light transmitting sections disposed within said hood, a tab, said tab having a greater depth than said sections, said tab being attached to a section acting as the terminal layer, and spring means bearing outwardly on said tab to urge said tab into engagement with said hood to maintain said tab and sections in a fixed position relative to said hood.

7. The combination of claim 6 wherein each of said arcuate sections has the same radius of curvature.

References Cited in the file of this patent

UNITED STATES PATENTS

| | | |
|---|---|---|
| 2,446,674 | Sproul | Apr. 10, 1948 |
| 2,465,354 | Clark | Mar. 29, 1949 |
| 2,588,916 | Field et al. | Mar. 11, 1952 |
| 2,664,473 | Brown | Dec. 29, 1953 |
| 2,679,557 | Miller | May 24, 1954 |